(12) United States Patent  (10) Patent No.: US 7,398,433 B2
Benedek et al.  (45) Date of Patent: Jul. 8, 2008

(54) SYSTEM AND METHOD OF PREVENTING A WEB BROWSER PLUG-IN MODULE FROM GENERATING A FAILURE

(75) Inventors: Joseph E Benedek, Issaquah, WA (US); Roberto A Franco, Seattle, WA (US); Quji Guo, Stanford, CA (US); J Craig Hally, Sammamish, WA (US); Reid T Holmes, Nanaimo (CA); Roman Pamucci, Bellevue, WA (US); Edward J Praitis, Woodinville, WA (US); Christopher T Sager, Bellevue, WA (US); Brian D Wentz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 10/814,591

(22) Filed: Mar. 31, 2004

(65) Prior Publication Data

US 2005/0240798 A1   Oct. 27, 2005

(51) Int. Cl.
*G06F 11/00* (2006.01)
(52) U.S. Cl. .......................... 714/57; 714/38
(58) Field of Classification Search ................... 714/57
See application file for complete search history.

(56) References Cited

U.S. PATENT DOCUMENTS 6,148,336 A * 11/2000 Thomas et al. .............. 709/224

6,629,267 B1 * 9/2003 Glerum et al. ................. 714/38
6,950,990 B2 * 9/2005 Rajarajan et al. ............ 715/736

OTHER PUBLICATIONS

Smith, Randy Franklin. Internet Explorer Security Options, Part 2. Windows IT Pro [online]. Apr. 21, 2001 [retrieved on Oct. 26, 2006]. Retrieved from the Internet:<URL: http://www.windowsitpro.com/Articles/Index.cfm?ArticleID=20622&DisplayTab=Article>. p. 1 and Figure 2.*
Windows 95/98/2000/NT MW Word 97-2000 Document Viewer Installation and Getting Started. UVa Information Technology and Communication [online]. Feb. 21, 2001 [retrieved on Oct. 26, 2006]. Retrieved from the Internet:<URL: http://www.itc.virginia.edu/desktop/docs/cdrom/windows_95_98_nt/word_97_viewer/>. p. 1.*

(Continued)

*Primary Examiner*—Scott T Baderman
*Assistant Examiner*—Paul F Contino
(74) *Attorney, Agent, or Firm*—Christensen O'Connor Johnson Kindness PLLC

(57) ABSTRACT

The present invention improves the stability of a Web browser by identifying plug-in modules that cause failures. Data in memory at the time of a failure is analyzed and a failure signature is generated. The failure signature is compared to a database of known failure signatures so that the source of the failure may be identified. If a plug-in module to a Web browser is identified as the source of a failure, options are presented to the user who may update the plug-in module with code that does not produce a failure or disable the plug-in module altogether.

16 Claims, 5 Drawing Sheets

OTHER PUBLICATIONS

Microsoft Error Reporting. Microsoft Corporation [online]. Jan. 1, 2003 [retrieved on Oct. 26, 2006]. Retrieved from the Internet: <URL: http://web.archive.org/web/20031208075735/watson.microsoft.com/dw/1033/dcp.asp?SD=GN&LN=EN-US&gssnb=1>. p. 3.*

Description and Availability of Internet Explorer Error Reporting Tool. Microsoft Knowledge Base [online]. May 8, 2003 [retrieved on Oct. 26, 2006]. Retrieved from the Internet: <URL: http://web.archive.org/web/20030323094618/http://www.support.microsoft.com/default.aspx?scid=KB;EN-US;q276550>. pp. 1, 3, and 4.*

Microsoft, Microsoft Computer Dictionary, 2002, Microsoft Press, Fifth Edition, p. 445.*

Macromedia Flash Player 5.0 Causes am Error Message in Windows XP. Microsoft Corporation. Jul. 21, 2002. [retrieved on May 23, 2007]. Retrieved from the Internet <URL: http://edge-op.org/iowa/www.iowaconsumercase.org/011607/8000/PX08558.pdf>. pp. 1-2.*

Arlat, J., et al., "Dependability of COTS Microkernel-Based Systems," *IEEE Transactions on Computers* 51(2):138-163, Feb. 2002.

Damm, A., "The Effectvieness of Software Error-Detection Mechanisms in Real-Time Operating Systems," *Proc. 16th Int. Symp. on Fault-Tolerant Computing (FTCS-16)*, IEEE Computer Society, Vienne, Austria, Jul. 1986, pp. 171-176.

Hollis, R., and B.S. Brunelle, "Developing a Common User Interface for Information Searching," *The Electronic Library* 13(4):283-286, Aug. 1995.

Oh, N., et al., "Control Flow Checking by Software Signatures," *IEEE Transactions on Reliability* 51(1):111-122, Mar. 2002.

Smith, R.E., "Cost Profile of a Highly Assured, Secure Operating System," *AMC Transactions on Information and Systems Security* 4(1):72-101, Feb. 2001.

* cited by examiner

*Fig. 4.*

| APPLICATION NAME 402 | APPLICATION VERSION 404 | LIBRARY NAME 406 | LIBRARY VERSION 408 | LIBRARY OFFSET 410 | EXCEPTION CODE 412 |
|---|---|---|---|---|---|
| INTERNET EXPLORER | 6.0 | DLL A | 1.0 | 32 | STATUS ACCESS VIOLATION |
| INTERNET EXPLORER | 5.5 | DLL B | 2.1 | 256 | STATUS STACK OVERFLOW |
| INTERNET EXPLORER | 5.0 | DLL C | 1.01 | 512 | STATUS INVALID OPCODE |
| INTERNET EXPLORER | 5.5 | DLL D | 1.1 | 8 | OBJECT NOT INITIALIZED |

400

SYSTEM AND METHOD OF PREVENTING A WEB BROWSER PLUG-IN MODULE FROM GENERATING A FAILURE

FIELD OF THE INVENTION

The present invention relates to computer programs and, in particular, to a Web browser that supports plug-in modules.

BACKGROUND OF THE INVENTION

One of the reasons the World Wide Web (or Web) is so popular is the ability of users to publish and interact with rich content. Examples of rich content include Web sites with both foreground and background images, multiple colors, interactive controls, fonts, audio clips, code modules, and animation. Users generally interact with rich content using Web browsers. Web browsers display rich content from Web sites to the user and permit the user to interact with rich content using input devices such as a keyboard or a mouse. Many software applications generate professional looking rich content that may be displayed on Web sites. These applications enable a user to create rich content including images, fonts, sounds, animation, and user-interactive controls. As more users discover the rich content available through various networks, such as the Internet, the stability of Web browsers is increasingly more important.

Web browsers generally display "standard" rich content: rich content containing those features defined according to some standard. HTML (hypertext markup language), XHTML (extensible hypertext markup language), and XML (extensible markup language) are examples of rich content formats that have been "standardized" by the World Wide Web Consortium (the W3C), a widely recognized standardization body for developing interoperable technologies for information exchange, commerce, and communication on the Web. Before they become standards according to the W3C, or some other standardization body, proprietary or specialized features developed within the foregoing (and other) formats are deployed on Web sites. Some of these new features may never be standardized. For these cases, most Web browsers have been developed to accept plug-in modules. In general, plug-in modules are software extensions to an application, specifically, in this case, a Web browser such as Microsoft's Internet Explorer®. A user will typically install a plug-in module into a specific directory location associated with a Web browser. This will typically be a known location that the Web browser searches when starting up. If the plug-in module is properly located, the Web browser will interact with the plug-in module to extend, or enhance, the Web browser's abilities, including displaying nonstandard, proprietary features stored in a Web file.

Among many other items, existing Web browsers support plug-in modules that provide rich content such as ActiveX controls, browser helper objects, toolbar extensions, and the like. The above-described rich content may be provided by individuals or organizations with the desire to add functionality to an existing Web browser (i.e., third parties). Combining these features—Web browsers adapted to function as display modules having plug-in extensibility—creates an extremely adaptable and powerful display and extensibility mechanism. Unfortunately, plug-in modules, if designed incorrectly, may cause a Web browser to "crash" or fail. As known to those skilled in the art and others, failures are frustrating to users and may result in the loss of information. Typically, a failure occurs when a program performs an operation that is not permitted by an operating system.

A substantial portion, if not almost all, of the failures in existing Web browsers are caused by errors in plug-in modules. To the user, the cause of the failure is unknown. Some users mistakenly believe that the failure is caused by an error in the Web browser and continue to use plug-in modules created by third parties, resulting in continued instability. Obviously, the usability of the Web browser is reduced when the user does not know the cause of a failure and is unable to prevent future failures. Existing Web browsers do not identify the cause of a failure or assist users in preventing future failures. Instead, Web browser providers receive reports from users who experience failures and from these reports identify the cause of the failure. If a plug-in module caused the failure, the Web browser provider may either provide an update that disables the plug-in module or request an update from the third party that created the plug-in module.

As mentioned above, the current Web browser failure prevention paradigm is a reactionary system; i.e., the Web browser is updated to prevent failures only after failures are reported. Furthermore, the Web browser update cycle is an extremely costly process for the Web browser provider, and ultimately for consumers of the Web browser.

In light of the above-identified problems, it would be beneficial to computer users, both in terms of convenience and in terms of cost-effectiveness, to have a Web browser that identifies plug-in modules that cause failures. Further, it would be beneficial to computer users to have a Web browser that allows users to disable or update plug-in modules that cause failures. The present invention is directed to providing such a Web browser.

SUMMARY OF THE INVENTION

The present invention is generally directed to improving the stability of a Web browser by identifying plug-in modules that cause failures and permitting users to disable or update problematic plug-in modules. More specifically, the present invention provides a method that analyzes data in memory at the time of a failure and compares this data to a database of known failures. If a plug-in module to a Web browser is identified as the source of a failure, options are presented to the user, who may update the plug-in module with code that does not produce a failure or disable the plug-in module altogether.

Another embodiment of the present invention is a utility program launched from inside a Web browser. The utility program displays plug-in modules installed with a Web browser and permits users to disable/enable the plug-in modules. Also, the utility program provides information about the plug-in modules such as whether updates are available and where an update may be obtained.

Another aspect of the present invention is a system that includes a client computing device, a Web browser, a plug-in module, a Web browser window, an application processing module, a content display module, an event listening module, a failure prevention module, and a failure signature database. The system displays rich content to users including rich content generated by plug-in modules. If a failure occurs and a plug-in module is identified as the source of the failure, options are presented to the user for preventing failures in the future.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a table of failure signatures that illustrates a representative section of a failure signature database.

DETAILED DESCRIPTION OF THE PREFERRED EMBODIMENT

The present invention is generally directed to improving the stability of a Web browser by identifying plug-in modules that cause failures and permitting users to update or disable the problematic plug-in modules. In one embodiment, a failure in a computing device is analyzed and a mechanism for preventing failures in the future is provided. More specifically, a method analyzes a failure by collecting data in memory and comparing the collected data to a database of known failures. If a plug-in module is identified as the source of the failure, options are presented to the user, who may update the plug-in module with code that does not produce a failure or disable the plug-in module altogether.

Although the present invention will be described in the context of a Web browser such as Microsoft's Internet Explorer®, those skilled in the relevant art and others will appreciate that the present invention is also applicable to other programs that make use of third-party plug-in modules. The following description first provides an overview of a system in which the present invention may be implemented. Then a method that identifies the source of a failure and presents users with options for preventing failures in the future is described. The illustrative examples provided herein are not intended to be exhaustive or to limit the invention to the precise forms disclosed. Similarly, any steps described herein may be interchangeable with other steps, or several combinations of steps, in order to achieve the same result. Accordingly, the described embodiments of the present invention should be construed as illustrative in nature and not as limiting.

Figure 1:
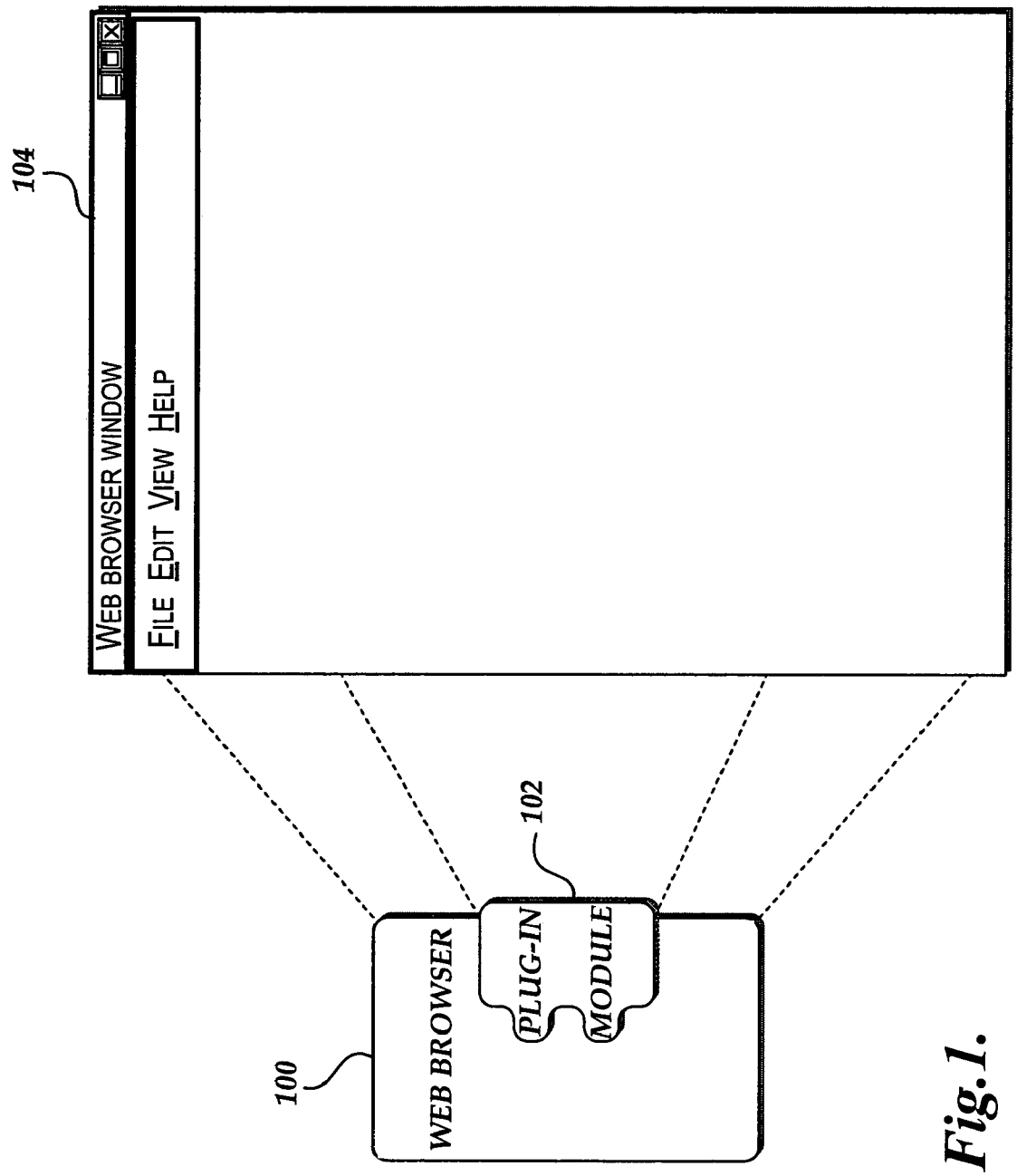
FIG. 1 is a pictorial depiction of a Web browser including a plug-in module and a Web browser window that illustrates the process of displaying rich content to users in accordance with the present invention.

FIG. 1 is a pictorial depiction of a Web browser 100 configured to embody the present invention. For ease of illustration and because they are not important for an understanding of the present invention, FIG. 1 does not show the components of the Web browser 100. FIG. 1 does show a plug-in module 102 that extends the functionality of the Web browser 100 when displaying rich content in a Web browser window 104. As described above, rich content may be in a standardized format such as HTML, XHTML, or XML. Conversely, rich content may be in a non-standardized format such as ActiveX controls, browser helper objects, toolbar extensions, and the like. Although this example illustrates a Web browser with a single plug-in module, those skilled in the art and others will appreciate that additional plug-in modules may be included.

Developers that create plug-in modules utilize a programming interface available from existing operating systems such as the Component Object Model ("COM") programming interface. A programming interface (or, more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc., of a component in a system capable of communicating with one or more mechanism(s), method(s), function call(s), module(s), etc., of other component(s). The term "segment of code" is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether the code segments are located on the same or different machines or distributed across multiple machines.

Objects such as COM objects are segments of code that add functionality to existing programs (i.e., objects are used to create plug-in modules). Typically, objects are self-contained, language-neutral code that are identified with a unique identifier (hereinafter "class identifier"). When an object such as plug-in module 102 is installed on a computing device, the object's class identifier is stored in the system registry. As known to those skilled in the art and others, the system registry is a database used to store settings, options, and preferences regarding the operation of a computing device including settings for all the hardware, software, and user preferences. An object is not functional unless certain information including the object's class identifier is contained in the system registry. As known to those skilled in the art, a system registry is one illustrative example of a database used to store settings, options, and preferences regarding the operation of a computing device.

In addition to the class identifier, the system registry also stores references to libraries such as dynamically linked libraries (hereinafter "DLLs") which contain an object's definitions, code segments, and data. Typically, executable programs like plug-in module 102 are constructed by combining segments of source code obtained from different locations. The segments may be combined before compiling and then compiled into an executable program. Alternatively, when a segment of source code is frequently used, it is often preferable to compile the segment separately and produce a library, and to combine the library with other libraries when the functionality of the library is actually needed. DLLs are one example of libraries of compiled code. Libraries that satisfy function calls to a programming interface are stored in the system registry with the class identifier of the calling object. As described below with reference to FIG. 3, the present invention uses the contents of the registry to determine whether a plug-in module used to extend the functionality of a Web browser is the source of a failure.

Figure 2:
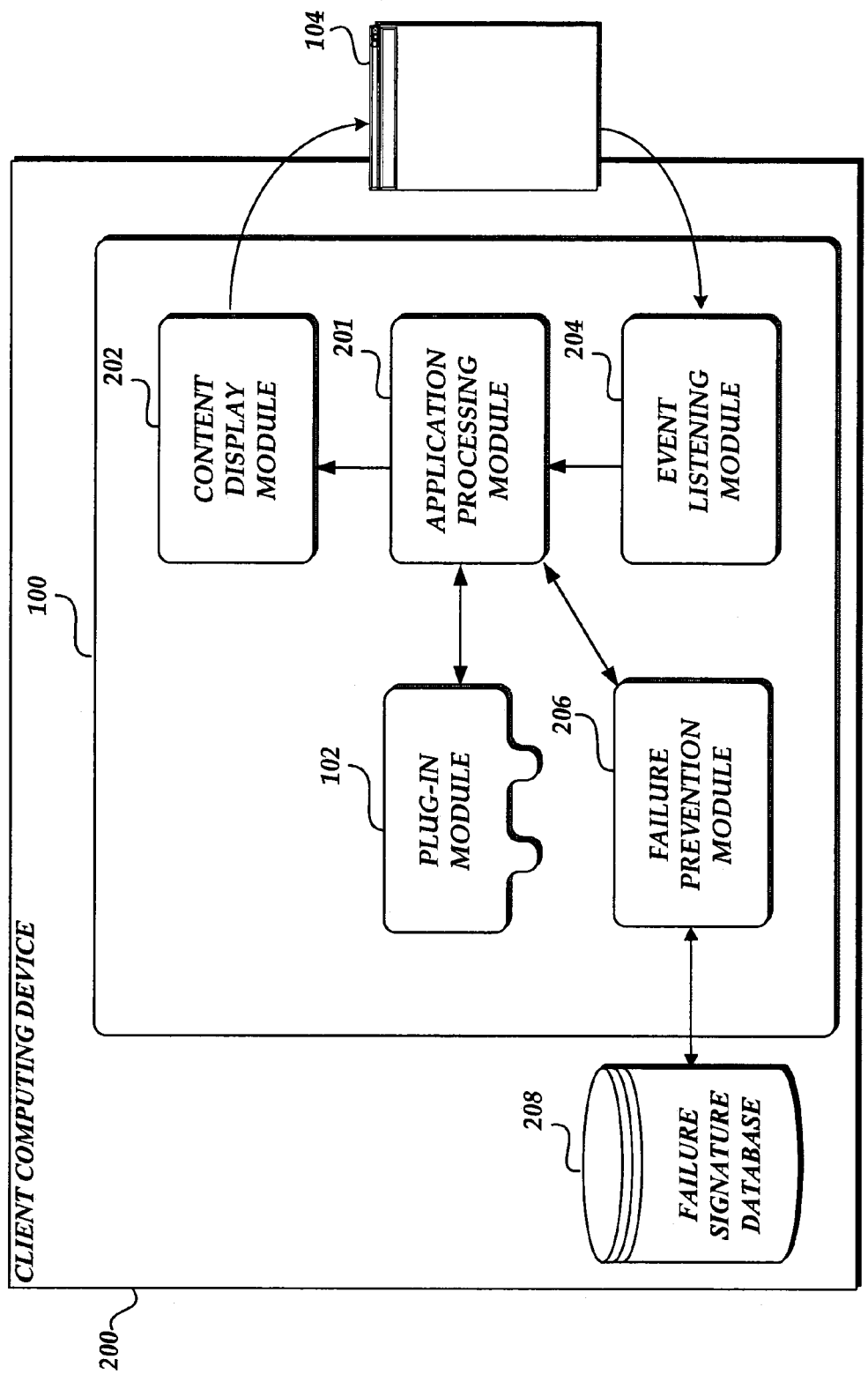
FIG. 2 is a pictorial diagram of the Web browser of FIG. 1, including components contained therein and a client computing device suitable to implement embodiments of the present invention.

FIG. 2 is a block diagram of a client computing device 200 and components of an exemplary Web browser 100 suitable for hosting plug-in modules, and for displaying plug-in supplied content in a Web browser window 104. Client computing device 200 may be any one of a number of computing devices including, but are not limited to, personal computing devices, hand-held computing devices, server-based computing devices, personal digital assistants, mobile telephones, stand-alone memory devices, electronic devices having some type of memory, and the like. For ease of illustration and because they are not important for an understanding of the present invention, FIG. 2 does not show the typical components of client computing device 200 such as a keyboard, a mouse, a printer, or other input/output devices, a central processing unit, a display, etc. Also, FIG. 2 does not show other computing devices that may be connected to client computing device 200. Those skilled in the art will appreciate that plug-in modules are used to extend the functionality of a Web browser 100. Microsoft's Internet Explorer® is one example of a Web browser that supports plug-in modules. The Web browser 100 includes an application processing module 201 that is the processing core of the Web browser 100. Because Web browsers are created to perform a variety of tasks, the application processing module 201 is only discussed in relation to this application in a generic fashion. The application processing module 201 carries out the general functions of the Web browser 100 and cooperates with the plug-in module 102 to extend the functionality of the Web browser 100.

The plug-in module 102 communicates and exchanges information with the application processing module 201 in order to cooperatively carry out the added functionality provided by the plug-in module 102. Additionally, the plug-in module 102 may have related content to display to a user apart from the cooperative processing with the application processing module 201.

FIG. 2 also illustrates that the Web browser 100 includes a content display module 202. The content display module 202 generates the Web browser window 104 and sends content processed by the application processing module 201 to the Web browser window 104. The content display module 202 then causes the Web browser window 104 to display rich content.

The Web browser 100 shown in FIG. 2 also includes an event listening module 204. The event listening module 204 listens for event messages generated by the user from Web browser window 104. The event listening module 204 may listen for nothing more than a notice of closing of the Web browser window 104. Alternatively, the event listening module 204 may receive event messages generated from controls embedded in the Web browser window 104 by plug-in module 102. To receive event messages, also known as callbacks, from controls embedded in content displayed in Web browser window 104, the plug-in module 102 must implement a small, well-defined set of routines. As illustrated in FIG. 2, event messages between the Web browser window 104 and the plug-in module 102 are passed by the application processing module 201.

As will be better understood from the following description, embodiments of the present invention are implemented by a set of software-generated routines located in a failure prevention module 206. As illustrated in FIG. 2, the failure prevention module 206 is interconnected and able to communicate with the application processing module 201 and a failure signature database 208. As described in more detail below, the application processing module 201 notifies the failure prevention module 206 when a failure occurs. Then the failure prevention module 206 searches the failure signature database 208 and determines if a plug-in module such as plug-in module 102 caused the failure. If a plug-in module caused the failure, the failure prevention module 206 presents the user with options for updating or disabling the plug-in module.

As known to those skilled in the art, FIG. 2 is a simplified example of a system that supports plug-in modules. Actual embodiments of a Web Browser will have additional components not illustrated in FIG. 2 or described in the accompanying text. Also, FIG. 2 shows one component architecture for supporting plug-in modules, and other component architectures that implement embodiments of the present invention are possible.

Figure 3:
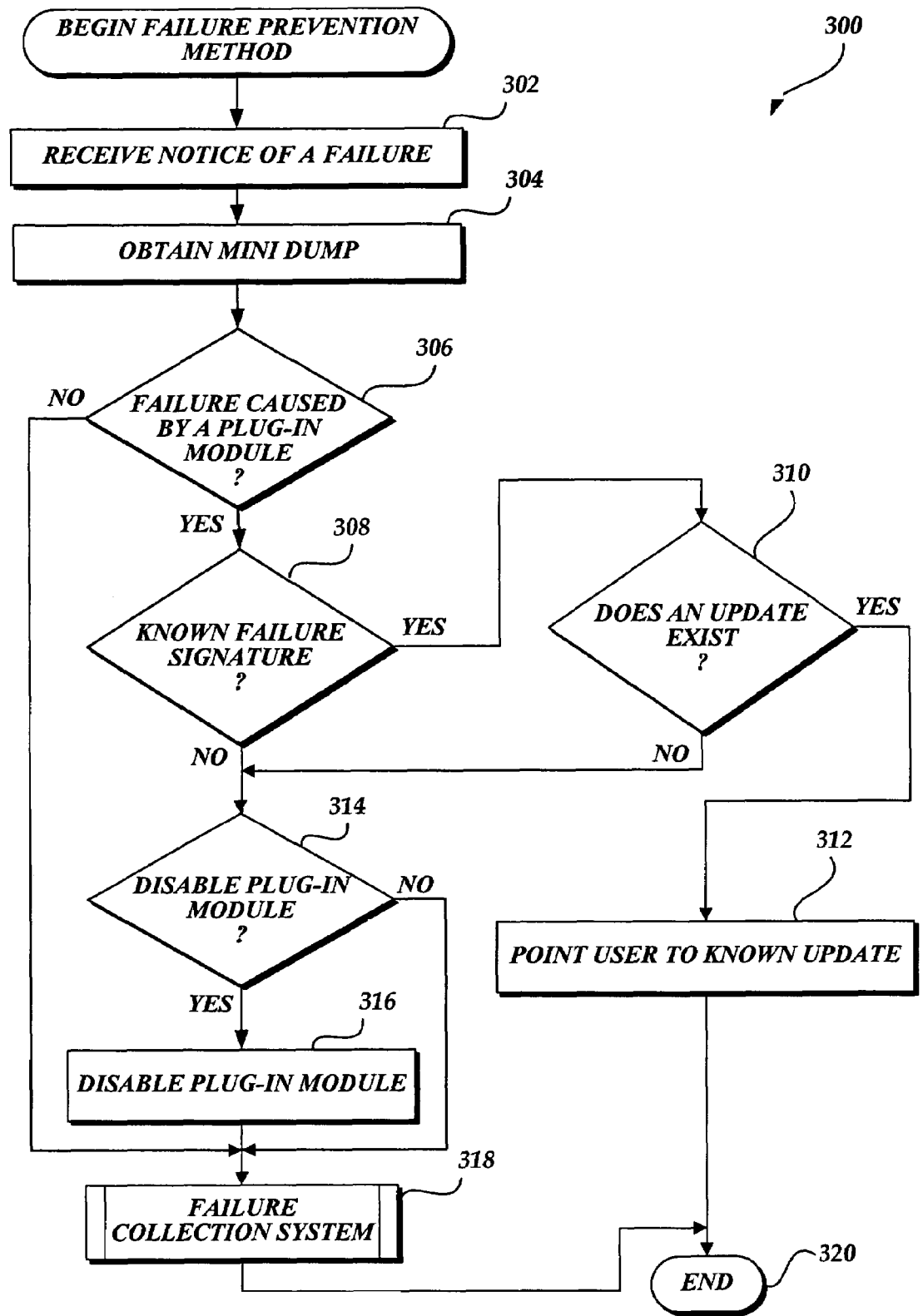
FIG. 3 is a flow diagram illustrating a method that analyzes failures in a Web browser and provides a mechanism for preventing failures in the future in accordance with the present invention.

FIG. 3 is a flow diagram illustrating one exemplary embodiment of a failure prevention method 300 formed in accordance with the present invention and suitable for implementation as computer-executable instructions stored on a computer-readable medium. In summary, the failure prevention method 300 receives a notice when a Web browser fails. In response to receiving the notice, the method analyzes a "minidump" of the failure identifying any plug-in modules that caused the failure. The failure prevention method 300 differentiates between failures caused by plug-in modules from failures caused by other segments of code. For those failures caused by plug-in modules, users are given options for preventing future failures. With continuing reference to FIGS. 1-2 and the accompanying descriptions, the exemplary failure prevention method 300 illustrated in FIG. 3 will now be described.

The failure prevention method 300 begins at block 302 where the method receives a notice that a Web browser failed. As known to those skilled in the art and others, a notice that a failure occurred may be generated by the use of conventional functions available from existing operating systems such as a Microsoft® operating system, UNIX operating system, LINUX™ operating system, and the like.

Upon receipt of a notice that a Web browser failed, the failure prevention method 300 proceeds to block 304 where the method obtains a minidump file (hereinafter "minidump") that recorded the memory contents of the computing device at the time of the failure. Many operating systems generate a full crash dump or core dump files (hereinafter "crash dump") when the operating system recognizes a failure. Traditionally, when generating a crash dump, the operating system switches to a minimal mode of operation and attempts to save memory contents to a file on disk. A developer may subsequently use the saved information to analyze the failure, for example, offline at a later date. Generally, a complete crash dump is a record of all memory present in a computing device saved to a file. A complete crash dump provides developers with access to data structures relating to the state of different components at the time of the crash. The large size of complete crash dumps makes it cumbersome to isolate the computer code that caused the failure because a vast amount of system information must be read. Also, transmission of large files over a network consumes resources and time, reducing the convenience of remote failure prevention systems. Therefore, mechanisms have been developed to generate a minidump, which is an abbreviated record of a crash dump. A detailed description of creating a minidump from a crash dump is found in commonly assigned U.S. Pat. No. 6,681, 348, titled CREATION OF MINI DUMP FILES FROM FULL DUMP FILES, issued Jan. 20, 2004, the content of which is expressly incorporated herein by reference.

After the minidump is obtained, the failure prevention method 300 proceeds to decision block 306 where the method determines if the failure was caused by a plug-in module to a Web browser.

To determine if a failure was caused by a plug-in module to a Web browser, the failure prevention method 300 compares data available in the minidump obtained at block 304 with data contained in a database such as the system registry. As described above with reference to FIG. 1, developers that create plug-in modules utilize programming interfaces provided by existing operating systems such as the COM programming interface. When an object, such as a plug-in module, is installed on a computing device 200, a database such as the system registry associates the object's class identifier with libraries used by the object and the application that the object interacts with to extend. When an object such as a plug-in module executes, libraries used by the object are loaded into memory. Since developers each build libraries designed to implement their individual plug-in modules, the set of libraries used by an object is unique. In the event of a failure, the memory contents of the computing device 200 including the library executing at the time of the failure is recorded in the minidump. The present invention identifies the object (i.e., plug-in module) that caused the failure by obtaining the name and version of the library that was executing at the time of the failure from the minidump. Once the name and version of the library that produced the failure are known, the system registry is searched. If an object is identified in the system registry as both using the library that produced the failure and extending the functionality of a Web browser, then the failure was caused by a plug-in module to a Web browser.

If the failure was not caused by a plug-in module that extends the functionality of a Web browser, the failure prevention method 300 proceeds to block 318 described in detail below. Conversely, if the failure was caused by a plug-in module that extends the functionality of a Web browser, the failure prevention method 300 proceeds to decision block 308 where the method determines if the minidump reveals a known failure signature.

To determine if a failure reveals a known failure signature at block 308, the failure prevention method 300 extracts data from the minidump and compares it to information contained in the failure signature database 208. As described above, the minidump identifies the library that was executing at the time of the failure. Among other data, the minidump also stores the application name, application version, library version, library offset, and exception code generated by the operating system when the failure occurred. As described in more detail below, data is extracted from the minidump to generate a failure signature and compared to a database of known failure signatures. If the failure signature extracted from the minidump matches a known failure signature, the user is prompted for instructions on updating or disabling the object (i.e., plug-in module) that generated the failure.

For illustrative purposes, a representative section of failure signature database 208 (FIG. 2) is illustrated in FIG. 4. In this example, the failure signature database 208 contains a plurality of database records stored in a table 400, where each record is contained in a row of the table. Each record contains a number of database fields that, in this example, are identified as APPLICATION NAME 402, APPLICATION VERSION 404, LIBRARY NAME 406, LIBRARY VERSION 408, LIBRARY OFFSET 410, and EXCEPTION CODE 412. In each record, the APPLICATION NAME 402 and APPLICATION VERSION 404 fields store the application name and version that was executing at the time of the failure. The LIBRARY NAME 406 and LIBRARY VERSION 408 fields store the name and version number that collectively identify the LIBRARY that generated the failure. The LIBRARY OFFSET 410 field stores a numeric value representative of the code location in the library where the failure occurred. The EXCEPTION CODE 412 field stores exception code generated by the operating system in response to the failure. As known to those skilled in the art, when a failure occurs, an operating system generates exception code that identifies the specific type of failure that occurred. The information contained in each record including database fields 402, 404, 406, 408, 410, and 412 collectively form a failure signature that is used by the present invention to identify plug-in modules that cause failures. Although this example illustrates one database table and failure signature having specific attributes, those skilled in the art will appreciate that the present invention may operate with more or fewer than all of the listed attributes. In addition, those skilled in the art will appreciate that other fields may be added to accommodate other embodiments of the present invention.

Returning to FIG. 3, at decision block 308, the failure prevention method 300 obtains the name, version, and offset of the library that was executing at the time of the failure. As described above with reference to FIG. 4, the library offset is a numeric value that represents the code location in the library where the failure occurred. Also, the exception code generated by the operating system in response to the failure is obtained from the minidump at block 308. Since searching a file (i.e., the minidump) for information about a library and exception code is known in the art, further description of such process is not described here. Once the name and version of the library that produced the failure are known, the system registry is searched for the object (i.e., plug-in module) that uses the library. Once the object that uses the library is identified, the application name and version that the object interacts with to extend are also obtained from the system registry. The information identified at block 308 including the application name, application version, library name, library version, library offset, and exception code are collected to form a failure signature. The failure signature is compared with failure signatures stored in a database such as failure signature database 208.

If the current failure signature does not match a known failure signature, the failure prevention method 300 proceeds to block 314 described below. Conversely, if the failure signature generated at block 308 does match a known failure signature, the failure prevention method 300 proceeds to decision block 310 where the method 300 determines if an update exists to the plug-in module that generated the failure. Typically, plug-in modules are created and updated by third parties (i.e., entities other than the Web browser provider). Information regarding updates to plug-in modules is maintained and queried from a database. Since querying a database for the type of data described above is generally known in the art, such a process is not described here.

If an update to a plug-in module does not exist, the failure prevention method 300 proceeds to block 314 described below. Conversely, if an update does exist, the failure prevention method 300 proceeds to block 312 where the user is provided with information regarding the update. In an exemplary embodiment, a prompt informs the user that a plug-in module that extends the functionality of a Web browser caused a failure. Also, the user is provided with information regarding where an update may be obtained, such as a Web site or distribution center. Then the failure prevention method 300 proceeds to block 320 where it terminates.

At block 314, the user is provided with information regarding the failure of a plug-in module. In an exemplary embodiment a prompt displays a message to the user indicating that a plug-in module that extends the functionality of a Web browser was the source of a failure. The message also prompts the user for instructions on handling the failure such as whether the plug-in module should be disabled. Those skilled in the art will recognize that a message may be generated and displayed to the user with techniques known to those skilled in the art. If the user does not want to disable the plug-in module, the failure prevention method 300 proceeds to block 318 described in detail below.

If the user does want to disable the plug-in module, the routine proceeds to block 316 where the plug-in module that generated the failure is disabled. As described above, plug-in modules are objects with entries in a database such as the system registry. When a Web browser begins execution, the system registry is traversed so that plug-in modules that extend the functionality of the Web browser may be loaded into memory. In an exemplary embodiment, plug-in modules are disabled by changing or eliminating entries in the system registry that reference the plug-in module. As known to those skilled in the art and others, a plug-in module may be disabled using other techniques and methods generally known in the art, and the example described above should be construed as exemplary, not limiting.

At block 318, an existing failure collection system is notified of the failure and the minidump obtained at block 304 is collected in a repository on a remote computing device. A detailed description of an existing failure collection system suitable to store a minidump may be found in commonly assigned U.S. Pat. No. 6,629,267, titled METHOD AND SYSTEM FOR REPORTING A PROGRAM FAILURE, issued Sep. 30, 2003, the content of which is expressly incorporated herein by reference. Continued collection of failure data assists developers in updating systems designed to prevent failures such as the failure prevention module 206. Then the failure prevention method 300 proceeds to block 320 where it terminates.

The failure prevention method 300 described with reference to FIG. 3 above is one embodiment of the present invention where a plug-in module is updated in response to a failure. Another embodiment of the present invention is a utility program launched from a menu item in a Web browser. The utility program may be implemented with a graphical user interface with any one of a number of methods known in the art. The utility program displays plug-in modules installed on a computing device such as computing device 200 and permits users to disable the displayed plug-in modules. As described above, plug-in modules may be disabled by changing or eliminating entries in the system registry that reference the plug-in modules. Also, the utility program allows users to obtain information about the displayed plug-in modules such as whether an update exists and where an update may be obtained. Although this example illustrates one utility program having specific attributes, those skilled in the art will appreciate that the utility program may have additional attributes.

Figure 5:
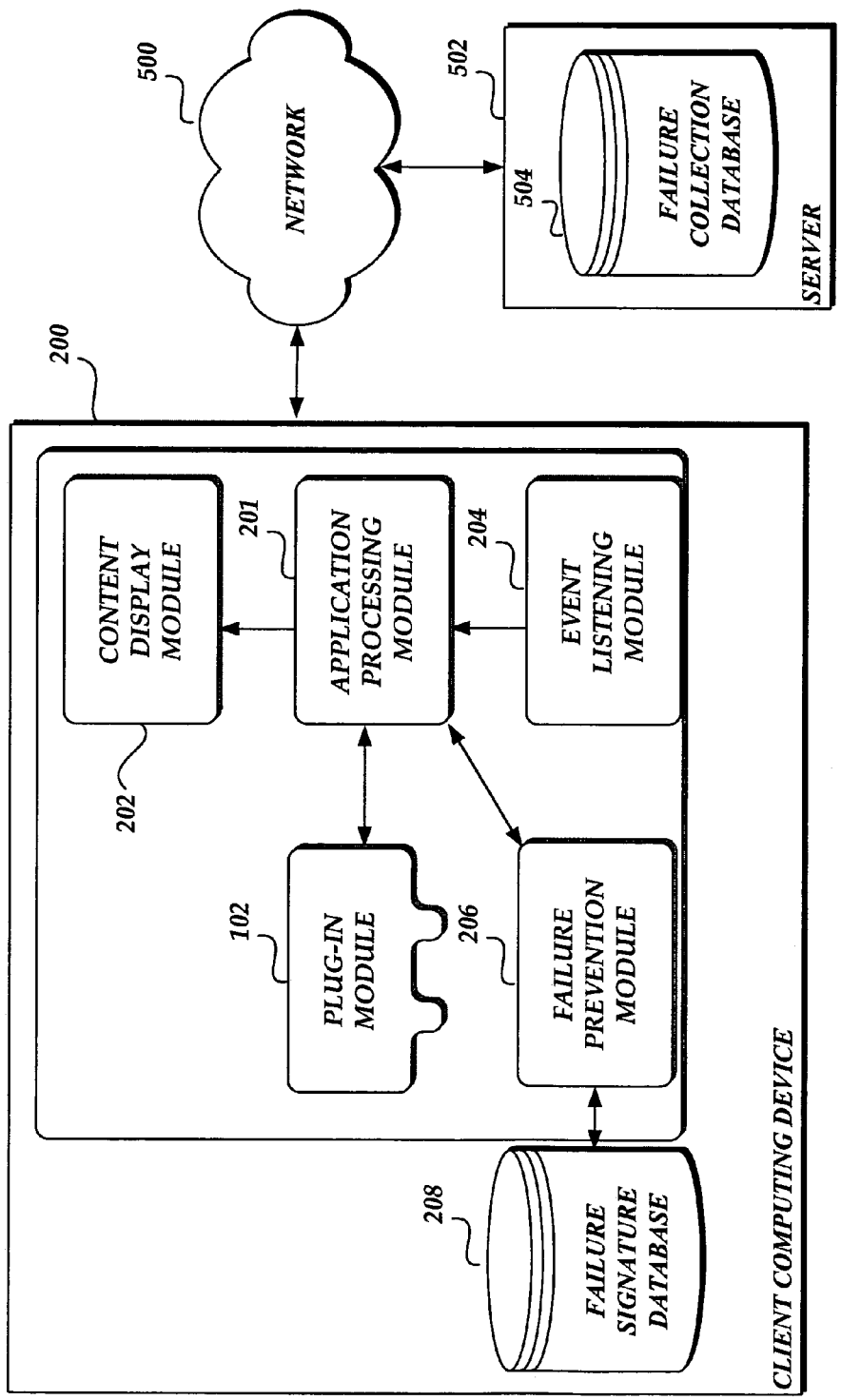
FIG. 5 is a pictorial diagram of a network, including a client computing device and a server computing device that provide a mechanism for preventing failures in plug-in modules in accordance with the present invention.

FIG. 5 illustrates a client computing device 200 of the type illustrated in FIG. 2 and described above connected via a network 500 to failure collection database 504 located in a remote server computing device 502. More specifically, like FIG. 2, the client computing device 200 includes a Web browser 100, a plug-in module 102, a Web browser window 104, an application processing module 201, a content display module 202, an event listening module 204, a failure prevention module 206, and a failure signature database 208. The network 500 connects the client computing device 200 and the server computing device 502. The network 500 may be any one of a variety of networks using any one of a variety of protocols known to those skilled in the relevant art. Further, as will be readily understood by those skilled in the relevant art and others, FIG. 5 is illustrative and should not be construed as limiting. More or fewer computing devices may be connected to the network 500.

As illustrated in FIG. 5, the software-implemented routines employed by embodiments of the present invention may be stored on a client computing device such as client computing device 200. As a result, the present invention is functional in stand-alone computing devices not connected to a network. However, the use of a Web browser inherently suggests that a computing device is connected to a network such as the Internet. Consequently, the software-implemented routines employed by embodiments of the present invention may be stored on a remote computing device such as server computing device 502 or any other computing device operative to transmit content to network 500.

A remote computing device such as server computing device 502 may be used for several purposes. The failure collection system described above with reference to FIG. 3 at block 318 may transmit data to a database such as the failure collection database 504 that assists developers in keeping failure prevention systems updated. For example, the server computing device 502 may be used to update the failure signature database 208 so that current information regarding updates to plug-in modules may be disseminated to users. As known to those skilled in the art, a remote computing device may be used for purposes in addition to the exemplary uses described above.

While the presently preferred embodiment of the invention has been illustrated and described, it will be readily appreciated by those skilled in the art and others that, within the scope of the appended claims, various changes can be made therein without departing from the spirit and scope of the invention.

The invention claimed is:

1. In a computing device having at least one plug-in module that extends the functionality of a Web browser, a method of identifying a plug-in module that generated a failure, comprising:
   in response to receiving notice of a failure, obtaining selected contents of memory of said computing device created at the time of the failure;
   generating a failure signature that is characteristic of the plug-in module that generated the failure;
   comparing said failure signature with one or more failure signatures generated by known plug-in modules; and
   allowing a user to disable the plug-in module that is the source of the failure instead of a category of plug-in modules.

2. The method as recited in claim 1, further comprising:
   if the failure signature is characteristic of a known plug-in module, determining if the known plug-in module has an update that does not generate a failure.

3. The method as recited in claim 2, further comprising:
   if the known plug-in module has an update that does not generate failures, informing a user of the availability of the update.

4. The method as recited in claim 1 wherein obtaining the contents in memory of said computing device at the time of the failure includes obtaining a minidump file.

5. The method as recited in claim 1 wherein generating a failure signature from the contents of memory that is characteristic of the plug-in module that generated the failure includes:
   identifying the library that was executing at the time of the failure;
   determining the plug-in module that uses said library; and
   identifying the application that interacts with the plug-in module that uses said library.

6. The method as recited in claim 5 wherein identifying the library that was executing at the time of the failure includes searching a minidump file.

7. The method as recited in claim 5 wherein determining the plug-in module that uses said library includes searching a system registry for associations between plug-in modules and libraries.

8. The method as recited in claim 5 wherein identifying the application that interacts with the plug-in module includes searching a system registry for associations between applications and plug-in modules.

9. A computer-readable medium bearing computer-executable instructions that, when executed, carry out a method of identifying a plug-in module that generated a failure, comprising:
   in response to receiving notice of a failure, obtaining selected contents of memory of said computing device created at the time of the failure;
   generating a failure signature that is characteristic of the plug-in module that generated the failure;
   comparing said failure signature with one or more failure signatures generated by known plug-in modules; and
   allowing a user to disable the plug-in module that is the source of the failure instead of a category of plug-in modules.

10. The computer-readable medium as recited in claim 9, further comprising:
    if the failure signature is characteristic of a browser plug-in module, determining if the known plug-in module has an update that does not generate a failure.

11. The computer-readable medium as recited in claim 10, further comprising:
    if the known plug-in module has an update that does not generate failures, informing a user of the availability of the update.

12. The computer-readable medium as recited in claim 9 wherein obtaining the contents in memory of said computing device at the time of the failure includes obtaining a mini-dump file.

13. The computer-readable medium as recited in claim 9 wherein generating a failure signature from the contents of memory that is characteristic of the plug-in module that generated the failure includes:
    identifying the segment of code that was executing at the time of the failure; and
    determining the library that contains said segment of code that was executing at the time of the failure; and
    identifying the application that interacts with the plug-in module that uses said library.

14. The computer-readable medium as recited in claim 13, further comprising determining if said segment of code that was executing at the time of the failure includes searching a minidump file.

15. The computer-readable medium as recited in claim 14 wherein determining if said segment of code is from a library used by a plug-in module to a Web browser includes searching a system registry for associations between plug-in modules and libraries.

16. The computer-readable medium as recited in claim 13 wherein identifying the segment of code that was executing at the time of the failure includes searching a system registry for associations between applications and plug-in modules.

* * * * *

UNITED STATES PATENT AND TRADEMARK OFFICE
CERTIFICATE OF CORRECTION

| | | |
|---|---|---|
| PATENT NO. | : 7,398,433 B2 | Page 1 of 1 |
| APPLICATION NO. | : 10/814591 | |
| DATED | : July 8, 2008 | |
| INVENTOR(S) | : Joseph E. Benedek et al. | |

It is certified that error appears in the above-identified patent and that said Letters Patent is hereby corrected as shown below:

In column 10, line 60, in Claim 5, delete "the library" and insert -- a library --, therefor.

In column 11, line 2, in Claim 7, delete "said library" and insert -- the library --, therefor.

In column 12, line 14, in Claim 13, delete "the library" and insert -- a library -- therefor.

Signed and Sealed this
Nineteenth Day of April, 2011

David J. Kappos
*Director of the United States Patent and Trademark Office*